US012761886B2

(12) United States Patent
Khan et al.

(10) Patent No.: US 12,761,886 B2
(45) Date of Patent: Oct. 13, 2026

(54) DYNAMIC USER INTERFACES AND CONTENT WITH REDUCED CODE DEVELOPMENT USING AN INTELLIGENT SCENARIO SIMULATION ENGINE

(71) Applicant: PAYPAL, INC., San Jose, CA (US)

(72) Inventors: Md Faisal Khan, Chennai (IN); Pankaj Sarin, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 411 days.

(21) Appl. No.: 18/486,036

(22) Filed: Oct. 12, 2023

(65) Prior Publication Data

US 2025/0123820 A1 Apr. 17, 2025

(51) Int. Cl.

*G06F 8/38* (2018.01)
*G06F 8/34* (2018.01)
*G06F 9/451* (2018.01)

(52) U.S. Cl.

CPC .................. *G06F 8/38* (2013.01); *G06F 8/34* (2013.01); *G06F 9/451* (2018.02)

(58) Field of Classification Search

CPC ............... G06F 8/38; G06F 8/34; G06F 9/451
See application file for complete search history.

(56) References Cited

U.S. PATENT DOCUMENTS

| | | | | |
|---|---|---|---|---|
| 12,190,056 | B1 * | 1/2025 | Verma | G06F 40/232 |
| 2023/0409298 | A1 * | 12/2023 | Ciminelli | G06V 10/945 |
| 2023/0410801 | A1 * | 12/2023 | Mishra | H04L 51/02 |
| 2024/0378393 | A1 * | 11/2024 | El Hattami | H04L 51/02 |
| 2024/0386213 | A1 * | 11/2024 | Ghoche | G06Q 30/015 |

* cited by examiner

*Primary Examiner* — Daniel Samwel

(74) *Attorney, Agent, or Firm* — Haynes and Boone, LLP

(57) ABSTRACT

There are provided systems and methods for dynamic user interfaces and content with reduced code development using an intelligent scenario simulation engine. A service provider, such as an online transaction processor, may provide computing services to users, such as electronic transaction processing, which may be facilitated and/or assisted by agents of the service provider. To provide dynamic user interfaces and content tailored to a user experience and based on different simulated scenarios of the user experience, the service provider may utilize a simulation engine to simulate permutations of user interfaces and content from combinations of the user and/or agents data and service states of available services that may be accessed and used through the user interfaces. This may utilize a large language model and/or generative AI to simulate such scenarios, as well as computing code for the user interfaces and calls to provide content via the services.

20 Claims, 7 Drawing Sheets

DYNAMIC USER INTERFACES AND CONTENT WITH REDUCED CODE DEVELOPMENT USING AN INTELLIGENT SCENARIO SIMULATION ENGINE

TECHNICAL FIELD

The present application generally relates to generating dynamic content and user interfaces (UIs), and more particularly to providing low and/or reduced code development of UIs and backend code to present dynamic content on computing devices.

BACKGROUND

Users may utilize various computing devices, such as personal computers, mobile smart phones, tablet computers, and wearable computing devices, to perform computing operations and communications. Computing devices may be used to interact with online service providers including going through communication channels to interact with live and/or automated agents and service endpoints of the service provider. Users may also utilize computing devices to perform electronic transaction processing with certain service providers, such as online transaction processors to order and/or purchase items, view payment and account data, search for items and services, and the like. These interactions may be facilitated through UIs and applications and/or websites presenting such UIs, which allow users to view content, interact with content and executable processes, and navigate to other UIs and content. However, content and UIs are currently provided in a static manner and do not account for a customer's journey, events, and/or characteristics when interacting with such UIs and content. Thus, users may receive poor and inadequate computing service provision through such static UIs and content, and therefore have a bad user experience (UX) with the service provider, which can lead to unintended transaction processing, reduction or elimination of user interactions with the service provider, and the like. As such, it is desirable to provide dynamic content and UIs to users in a predictive and simulated manner to improve computing services provided to users.

Figure 1:
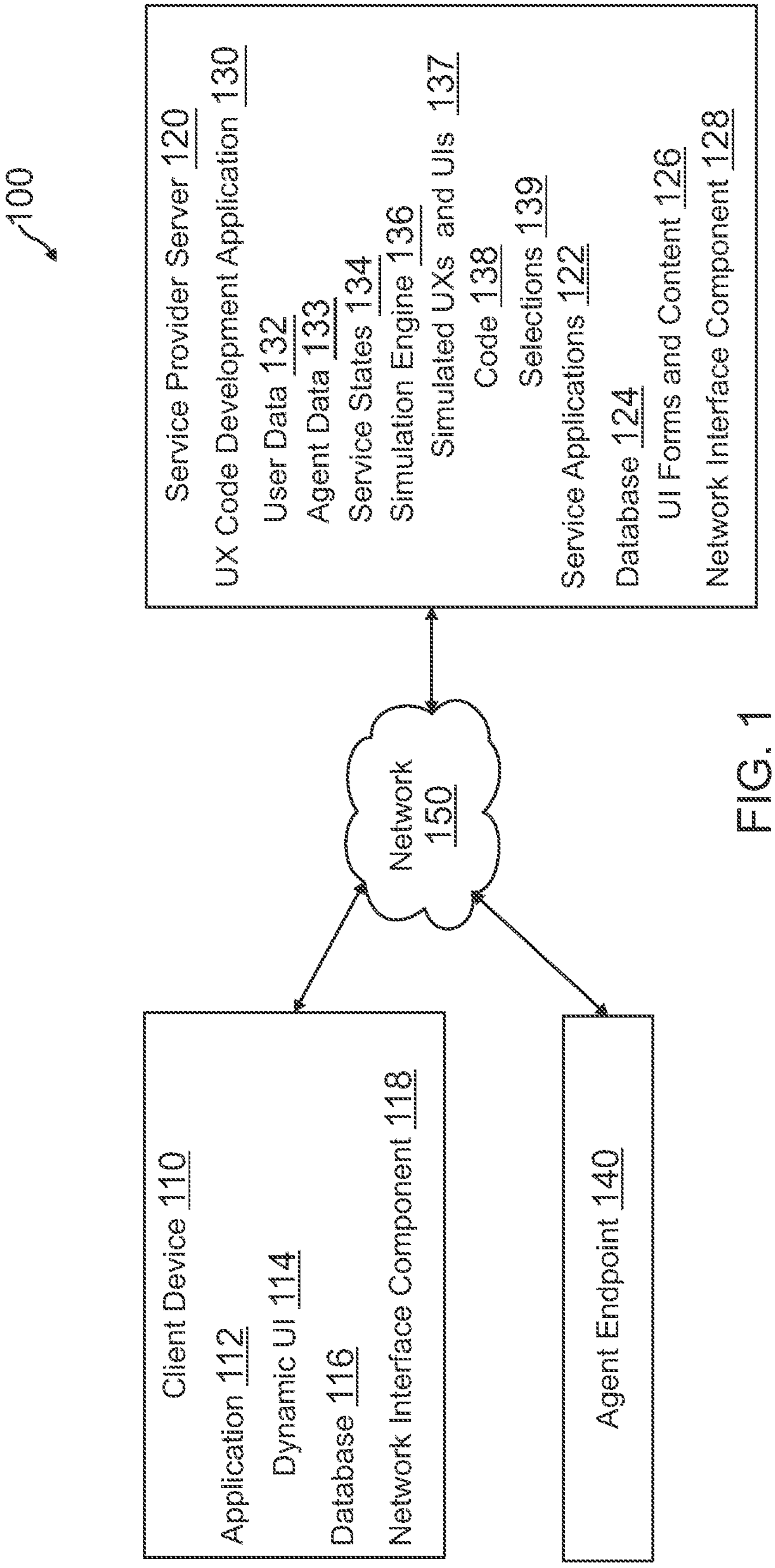
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for dynamic UIs and content with reduced code development using an intelligent scenario simulation engine. Systems suitable for practicing methods of the present disclosure are also provided.

A service provider, such as an online transaction processor, may detect that a user is interacting with one or more computing services, agents, and/or service endpoints of the service provider, such as requesting assistance through help or service channels and/or interacting with a live agent, automated chatbot, or the like for service usage. Service providers may configure their systems, including UIs and content, to be delivered to users through user devices for these interactions and services during runtime and from production computing environments. Conventionally, such configuring of data, data objects, code, and the like goes through stages of development, testing, and then deployment. Thereafter, static code for UIs and content may be delivered to users through their user or computing devices. As such, conventional service providers may provide generic webpages, UIs, and content that are available to many different customers and other users for interaction without consideration of their past experiences and/or current needs.

Thus, this traditional approach does not consider the customer's journey (or, more generally, a user's journey for other types of end users engaging with a service provider) and personal characteristics for the user interacting with the service provider. A customer's journey may correspond to actions and/or interactions of a customer with the products and/or services provided by a service provider. A customer journey may describe processes that a customer or other user undergoes to utilize these products and/or services of a service provider. With an online transaction processor, such processes may be associated with the actions and interactions with payment processing computing services. The set of actions and/or interactions that a user takes with a service provider may be across multiple products and services and correspond to an overall goal or task (e.g., provide a payment to a merchant for a transaction), however, flows involved in this journey may be more granular (e.g., access an in-store payment interface, provide a payment via a QR code, etc.). For example, a customer's journey may correspond the interactions that the customer has over one or more channels that may utilize one or more products or services with the goal to complete a task. This may be a current and time sensitive task (e.g., an in-store payment) or may be longer task (e.g., account activity review and/or dispute resolution).

As previously noted, a customer's flow may be more granular than the customer's journey and be associated with a specific product or service (e.g., provided via an application UI or webpage for a specific payment service, such as retail payments, peer-to-peer payments, etc.). A customer's flow may therefore correspond to the interactions that are performed with that specific product or service. As such, each customer's journey or flow may correspond to a UX that the customer has with an online service provider's computing services, platforms, and the like, which may be provided through UIs that allow the customer, as well as agents interacting with the customer, to engage with the products and services of the service provider. A customer's journey or flow may be related to the UX of the customer with the service provider by identifying or defining the interactions and relationship of the customer with the service provider, and therefore provide a description of the feeling, thoughts, emotions, or other insights to the customer's personal experience with the service provider and/or corresponding products or services. While customer's journey are described herein with regard to providing dynamic UIs for current UXs of user's, it is understood similar operations and systems may be used with more granular flows of customer's where needed or appropriate.

For example, a customer's journey with a service provider may correspond to the current UX of the user with the service provider's services, agents, and/or available platforms for interactions. The customer's journey may also include previous UXs of the user, as well as services engaged in and/or utilized by the user including accounts, transaction processing, transaction histories, communications, requests for assistance, use of customer relationship management (CRM) or other service centers, and the like. More broadly, the customer's journey may be described as the path of interactions by the user with the service provider and the service provider's products and/or services, which may also include interactions with employees and other users associated with the service provider. In this regard, static UIs and content do not provide a current UX that considers and is tailored to a customer's journey, as well as their personal characteristics (e.g., communication preferences, device settings, medical conditions or requirements, nationality or language, location and laws, etc.).

To provide more tailored and user-specific UIs, more dynamic and personalized UIs may be developed. However, development is time consuming and does not provide opportunities for reuse. There may also be limitations or other requirements of agents assisting the user, as well as the user's device. As such, a service provider may provide dynamic content and UIs using a simulation engine that executes intelligent artificial intelligence (AI) models, such as machine learning (ML) models and/or neural networks (NNs), to simulate and/or predict desirable UIs and content for users based on the customer's journey, characteristics, and the like.

The service provider may determine user and/or device characteristics, as well as similar characteristics for a live agent assisting the user and/or limitations on automated chatbots and the like communicating with the user. The service provider may provide a framework through the simulation engine that allows the UI and backend code development to be faster through storage and retrieval for UI forms at an object level, where content may then be added to such forms dynamically. The forms may be edited dynamically for different field configurations and validation rules. Data may be loaded statically or dynamically, where for static data, value can be directly referenced from configurations and databases, and for dynamic data, application programming interface (API) calls may be made through callable interfaces. UI alignments and layouts may be organized and arranged in a user-friendly manner based on the user and/or device characteristics. Further, a generative AI may generate data files and/or objects including computing code executable to causing display and/or configuration of the dynamic UI. The computing code may also be executed by a hypertext transfer protocol (HTTP) framework for rendering of the UIs and content to users through webpages and web browsers. For example, with JavaScript Object Notation (JSON) code, JSON containers and/or data objects may be generated that provide a serialized data container of a type (e.g., array or object type), where the container corresponds to a file that include data and metadata in JSON coding. Thereafter, the UIs and content may be rendered and output to users via the service provider's platform for use with the agents, chatbots, and/or computing services of the service provider.

In order for users to utilize these services and receive dynamic content and UIs through low or reduced code development, an online service provider (e.g., an online transaction processor, such as PAYPAL®) may provide account services to users of the online service provider, as well as other entities requesting the services. A user wishing to establish the account may first access the online service provider and request establishment of an account. An account and/or corresponding authentication information with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments. This information may be used to process transactions for items and/or services and provide assistance to users with these payment instruments and/or payment processing. In some embodiments, the account creation may establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and other transaction processing services.

Once the account of a user is established with the service provider, the user may utilize the account via one or more computing devices, such as a personal computer, tablet computer, mobile smart phone, or the like. The user may engage in one or more online or virtual interactions that may be associated with electronic transaction processing, images, music, media content and/or streaming, video games, documents, social networking, media data sharing, microblogging, and the like. The user may utilize a computing device to consume media content, such as by viewing a video or images and/or listening to audio. This may be done through the initial UIs and content provided by the service provider on page or UI visit by the user via their corresponding computing device, which may trigger and/or cause simulation of UIs and engines based on the customer's journey and/or characteristics, as well as agent or other endpoint's information.

The service provider may provide a framework that allows UI and backend code development to be performed automatically and/or with lower times, requirements, and the like. This may include providing error handling and logging, support for encryption parameters, caching support, customer header support, admin context headers, calls to external APIs for dynamic data, friendly error messaging, and encryption of uniform resource indicators or locations (URIs or URLs). The service provider may generate dynamic UIs with dynamic content based on input data for the user, agent, device, and/or endpoints that may be involved in presenting data to the user via one or more UIs. To do so, the simulation engine may analyze different key performance indicators (KPIs) associated with user interactions and user/agent characteristics, events, activities, and/or customer's journey. For example, content may be varied and dynamically generated and/or provided based on the type of UI being used and/or service state of the service being provided to the user.

The service provider may access and/or determine a set of variable or features that may be used for UI and content generation and configuring dynamically and on-the-fly during a UX of a customer or other user with the service provider's systems, agents, and/or computing services. The variables may include internal and/or external factors, user and/or device characteristics, and/or previous activities, events, actions, or the like during a current or previous customer's journey or flow. Further, for the dynamic UI, there may be storage support for UI forms at an object level, where the UIs may be generated from such forms through form editing dynamically that allows for field configuration and validation rules to be changed. The simulation engine may therefore simulate different scenarios of UXs for the user when interacting with the service provider's system, agent, and/or computing services. These simulated scenarios may be used to create, code, and render dynamic UIs, as well as content within the UIs, that may assist the user when engaged with that simulated scenario for the user's UX. For example, a simulated scenario for a UX may be a web-based chat flow with an agent to engage in password recovery/reset through personal information verification, while another may be a text message-based flow for password recovery/reset using two-factor authentication. Simulation of scenarios, and thereafter creation of dynamic UIs and content for the simulated scenarios, may be done through a rule-based, ML model, or other AI approach, where the scenarios are predicted by the simulation engine. For example, large language models (LLMs) may be used, including with generative AI models, to predict a UX for a user and different scenarios for the UX based on permutations from combinations of input data (e.g., features or variables associated with user data, agent data, and/or service states during service assistance and provision).

For example, the simulation engine may determine different scenarios of UXs for the user, which may include a communication channel utilized to communicate with the user including a text-to-speech channel, a conversational channel, a multimedia channel, or the like. These scenarios and UIs may be determined based on user data for user-related features of the user, including real-time and/or time series events, user information or characteristics, and the like (e.g., service declines or issues, disputes, limitations, utterances, etc.) with any unique user characteristics (e.g., medical conditions, disabilities, device restrictions, region or language preferences or requirements, etc.). Agent data for agent-related features of an agent assisting the user may also be determined, including agent availability and/or characteristics and their similar unique characteristics. The simulation engine may also determine the content and/or content delivery for each channel including the fields and/or data in fields. Such data may correspond to the services available to or offered to the user, content or information about current services and/or customer's journey, assistance with different events or services and the like. Further, based on a current service state of different computing services, the simulation engine may simulate and/or predict the scenarios for UXs that are to be provided through dynamically created and configured UIs and content for the user.

The service provider may then build and provide a customized and dynamic UI with content to the user for use. The content may be varied depending on the UI type and/or channel being used, as well as based on the service state of the service being provided (e.g., service availability and/or status) and/or current UX of the user (e.g., where the user is during the customer's journey, assistance request, or the like). Multiple different scenarios and UIs may be generated, which may be presented to the user and/or agent for selection and/or configuration, or a most highly scored or rated UI may be automatically selected for presentation. Fields may be displayed or hidden based on values, and a data load for static or dynamic data may be provided. For dynamic data, API calls and configurations may be configured and used for data retrieval. Further, field labels may be localized to allow for field labels to be displayed in different languages or other required for users (e.g., based on user preferences), which allow for tailoring of the UI specifically for certain users and their needs (e.g., medical or disability requirements).

Additionally, the service provider may provide for different UI alignment and layout options and configurations automatically in the dynamic UIs (e.g., based on input variables) and/or by user request. For example, alignment options based on layout size may be supported for different user and/or device requirements or preferences, which allow for the form fields to be visually arranged and organized in a user-friendly manner. To provide the UIs, in some embodiments, code generation may be performed and provided, such as generating dynamic JSON objects for the dynamic UI based on user inputs in plain text (e.g., the user stating "I need a field for an email validation"), as well as JSON code for an HTTP framework to execute calls or the like. Thereafter, the dynamic UIs may be rendered and presented to the user via a web browser or application that the user is utilizing to interact with the service provider. This may correspond to a presentation of different options for the available dynamic UIs, as well as the content and other parameters for the UIs. Each dynamic UI may have a corresponding communication channel for rendering and/or use of the UI, which, when that UI is selected for use, may cause the UI to be provided in its corresponding channel. The simulation engine may perform further updating and changing of UIs, such as in real-time and/or as the user requests further dynamic UI provision.

In this manner, a service provider may provide automated and dynamic UI generation and provision to devices of users depending on the user's interactions, activities, and/or characteristics, as well as factoring in other external features and/or variables associated with the user's interactions and/or activities (e.g., of agents, endpoints, devices, etc.). This may allow for faster and more efficient development and provision of UIs and corresponding content with lower or reduced code development through the simulation engine by not requiring manual development and configuring of UIs. This may utilize a coordinated system of devices, servers, and the like to provide different dynamic UIs for different UXs of the user, which may better assist the user in their customer's journey based on corresponding services' states. Thus, the service provider may provide more efficient and faster code development with reduced manual costs and requirements for dynamic UIs and content.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a client device 110, a service provider server 120, and an agent endpoint 140 in communication over a network 150. Client device 110 may be used to establish an account with service provider server 120, which may be used for electronic transaction processing of items and content as well as interaction with and usage of services of the service provider. Agent endpoint 140 may be used by an agent to provide assistance, services, or the like to a customer utilizing client device 110 during use of such services. Service provider server 120 may process information from a customer's journey and/or agent input, as well as various conditions, attributes, and/or characteristics of the customer and/or the agent. This may be used with a simulation engine to simulate a best or optimized content and corresponding UI(s) for presentation to the user. The content and UI(s) may be generated based on dynamic JSON objects and APIs with corresponding calls to obtain and present such data to the customer on client device 110 and/or the agent at agent endpoint 140

Client device 110, service provider server 120, and agent endpoint 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented using any appropriate hardware and software configured for wired and/or wireless communication with service provider server 120 and/or agent endpoint 140, which may include processing transactions for items, as well as utilizing computing services and/or receiving assistances through dynamic UIs and content provided by service provider server 120. Client device 110 may be utilized by an individual user, consumer, or entity to interact with a platform provided by service provider server 120 for computing service usage. In various embodiments, client device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing devices may function similarly.

Client device 110 of FIG. 1 contains an application 112, a database 116, and a network interface component 118. Application 112 may correspond to executable processes, procedures, and/or applications with associated hardware. In other embodiments, client device 110 may include additional or different software as required.

Application 112 may correspond to one or more processes to execute software modules and associated components of client device 110 to provide features, services, and other operations for a user over network 150, which may include electronic transaction processing via application 112 and/or use and engagement with computing and assistance services through communication channels and a dynamic UI 114 having dynamic content from service provider server 120. In this regard, application 112 may correspond to specialized software utilized by a user of client device 110 that may be used to access a website or application UI to perform actions or operations. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information (e.g., a website for a merchant), presenting the website information to the user, and/or communicating information to the website. However, in other embodiments, application 112 may include a dedicated application of service provider server 120 or other entity (e.g., a merchant).

Application 112 may be associated with various types of information about the user, such as account information, user financial information, and/or transaction histories. The user information may be based on a transaction generated by application 112 for an item, such as using a merchant marketplace, using a merchant website, and/or when engaging in transaction processing at a physical merchant location. For example, a transaction may be generated, initiated, and/or detected by service provider server 120 and/or another online transaction processor. Application 112 may be used to electronically process purchases with service provider server 120. Application 112 may also be used to receive a receipt or other information based on transaction processing. In further embodiments, different services may be provided via application 112, including messaging, social networking, media posting or sharing, microblogging, data browsing and searching, online shopping, and other services available through service provider server 120. Thus, application 112 may also correspond to different service applications and the like including item ordering, purchasing, and/or delivering, as well as merchant and/or marketplace applications.

In various embodiments, content, information, and executable processes may be provided to a user utilizing client device 110, such as a customer of service provider server 120 and/or a merchant utilizing service provider server for transaction processing, through dynamic UI 114. Dynamic UI 114 may be provided to application 112 by service provider server 120 for dynamic content, UI controls, fields, menus, and other features. In some embodiments, dynamic UI 114 and/or other dynamic UIs and content may be provided to application 112 as executable instructions, partial instructions, application and/or UI configuration data, and the like, which may allow application 112 to generate and/or rendering dynamic UI 114. Dynamic UI 114 and/or the computing code for the instructions or other configuration data may be generated by service provider server 120 using user and/or agent characteristics, parameters, histories, activities, and/or other information. Further, dynamic UI 114 may be based on available content, pre-generated UI forms or templates, UI controls, and the like, as discussed herein. In some embodiments, dynamic UI 114 may be one of multiple (e.g., a plurality of) UIs provided to application 112 to be selected and configured, as well as may be one in a series of dynamic UIs for a processing or activity flow. As such, application 112 may be used to interact with, configure, input data to, and/or navigate between dynamic UI 114 and other content and/or UIs.

Client device 110 may further include database 116 which may include, for example, identifiers such as operating system registry entries, cookies associated with application 112 and/or other applications, identifiers associated with hardware of client device 110, or other appropriate identifiers. Identifiers in database 116 may be used by a payment/service provider to associate client device 110 with a particular account maintained by the payment/service provider, such as service provider server 120. Database 116 may also further store user activities, inputs, behaviors, and/or user information and characteristics, which may be provided to service provider server 120 for generating and configuring dynamic UI and content.

Client device 110 includes at least one network interface component 118 adapted to communicate with service provider server 120, agent endpoint 140, and/or other devices and/or servers over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide operations for providing dynamic UIs and content to users, such as customers of service provider server 120 and/or a merchant utilizing service provider server 120, for a UX that may be specifically computed and configured based on user and agent information. Various embodiments of the processes described herein may be provided by service provider server 120 and may be accessible by client device 110 when interacting with agent endpoint 140, as well and computing services of service provider server 120. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a UX code development application 130, service applications 122, a database 124, and a network interface component 128. UX code development application 130 and service applications 122 may correspond to executable processes, procedures, and/or applications with associated hardware. In other embodiments, service provider server 120 may include additional or different modules having specialized hardware and/or software as required.

UX code development application 130 may correspond to one or more processes to execute modules and associated specialized hardware of service provider server 120 to provide intelligent machine outputs for dynamic UIs and content from simulating UXs for users based on user and agent data 132, service states 134, dynamic UI and content parameters (e.g., based on available, pre-generated, and/or template UIs, UI forms, content and UI data, UI controls, and the like) and other service data. UX code development application 130 includes a simulation engine 136 that may generate simulated UXs using one or more ML models, NNs, or the like including LLMs and/or generative AI. Further, simulation engine 136 may include one or more additional ML models, NNs, or the like to dynamically generate UIs 137 having code 138, which may be configured using selections 139.

In this regard, UX code development application 130 may correspond to specialized hardware and/or software used by a user associated with client device 110 in conjunction with service applications 122 for intelligent computing services related to generating, providing, and/or rendering dynamic UIs and content to customers and/or agents, such as at client device 110 and/or agent endpoint 140, respectively. UX code development application 130 may receive or detect events that request data processing and intelligent outputs for dynamic UIs and content, such as when a customer using client device 110 enters a service and/or assistance flow and processing events or requests with service provider server 120.

Agent endpoint 140 may correspond to an endpoint of an automated or real agent engaging in providing a service or assistance flow to the user utilizing client device 110, which may similarly trigger or cause initiation of operation by UX code development application 130 to determine scenarios for providing assistance to the customer during a UX with that flow, computing service, or the like. For example, where the agent may be a real, live agent assisting a customer or other user during interactions by that user with service provider server 120 via client device 110, agent endpoint 140 may be implemented as a personal computer (PC), a smart phone, laptop/tablet computer, wristwatch with appropriate computer hardware resources, other type of wearable computing device, and/or other types of computing devices capable of transmitting and/or receiving data. However, agent endpoint 140 may also correspond to automated bots, programs, or applications, which may interact with users through scripts, rules, AI engines, and the like. Although only one agent endpoint is shown, a plurality of agent endpoints may function similarly.

During a UX of the user interacting with service provider server 120 via client device 110, events may occur, where the events may be associated with data processing requests, actions, activities, or the like that occur for a user, account, entity, device, or the like. For the events, user data 132 and agent data 133 may be collected, accessed, and/or determined. User data 132 may include information associated with client device 110, such as interactions, characteristics, events, activities, and/or users' journeys. These may also include real-time time series events including transaction declines, transaction disputes, account limitations, or user utterances, as well as user characteristics including medical conditions, disabilities, residencies, or languages. Agent data 133 may have similar characteristics that apply to agents and may also have corresponding real-time agent availability information including an agent skill level, hours of operation, an agent sentiment, or agent utterances. Service states 134 may correspond to current states, availability, or standing of computing services of service provider server 120, such as those provided by service applications 122. For example, service states 134 may include states such as "available," "good status," "failed," "partially failed," "high latency," etc., at different times, which identify their availability and status. Thereafter, simulation engine 136 may be used to simulate scenarios to provide a service, assistance, or the like to customers with the assistance of agents. Such scenarios may be used to generate UIs 137 having code 138.

In this regard, UX code development application 130 may utilize ML and/or DNN models, such as a LLM and/or generative AI, for UI and content generation and code development automatically without manual configuring and/ or coding of simulated UXs and UIs 137. These models and/or networks may have trained layers based on training data and selected ML features or variables configured to determine and output model scores and/or predictions for UIs and content generated dynamically, as well as such programmatically generated code for such UIs and content. The ML models and/or NNs of UX code development application 130 may initially be trained using training data corresponding to features or variables selected for training of the ML models and/or NNs for scenario prediction and generated when assisting customers during UXs. For example, ML features or variables may correspond to individual pieces, properties, characteristics, or other inputs for an ML model and may be used to cause an output by that ML model once the ML model has been trained using data for those features from training data. ML models may be used for computation and calculation of model scores based on ML layers that are trained and optimized. As such, ML models may be trained to provide a predictive output, such as a score, likelihood, probability, or decision, associated with a particular prediction, classification, or categorization.

For example, ML models and/or NNs may include DNN, ML, LLMs, generative AIs, or other AI models trained using training data having data records that have columns or other data representations and stored data values (e.g., in rows for the data tables having feature columns) for the features. When building ML models and/or NNs, training data may be used to generate one or more classifiers and provide recommendations, predictions, or other outputs based on those classifications and an ML or NN model algorithm and architecture. Such determinations may be used with service applications 122 during the provision of computing services, such as by providing dynamic UIs and content from simulated scenarios for different UXs. UIs 137 may having corresponding code 138 and may further be configured using selections 139 for UI and content rendering.

The algorithm and architecture for the ML models and/or NNs may correspond to DNNs, ML decision trees and/or clustering, LLMs, generative AI, and other types of ML architectures. The training data may be used to determine features, such as through feature extraction and feature selection using the input training data. For example, DNN models may include one or more trained layers, including an input layer, a hidden layer, and an output layer having one or more nodes; however, different layers may also be utilized. As many hidden layers as necessary or appropriate may be utilized, and the hidden layers may include one or more layers used to generate vectors or embeddings used as inputs to other layers and/or models. In some embodiments, each node within a layer may be connected to a node within an adjacent layer, where a set of input values may be used to generate one or more output values or classifications. Within the input layer, each node may correspond to a distinct attribute or input data type for features or variables that may be used for training and intelligent outputs, for example, using feature or attribute extraction with the training data.

Thereafter, the hidden layer(s) may be trained with this data and data attributes, as well as corresponding weights, activation functions, and the like using a DNN algorithm, computation, and/or technique. For example, each of the nodes in the hidden layer generates a representation, which may include a mathematical computation (or algorithm) that produces a value based on the input values of the input nodes. The DNN, ML, or other AI architecture and/or algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node(s) to produce one or more output values for ML models that attempt to classify and/or categorize the input feature data and/or data records. Thus, when the ML models and/or NNs are used to perform a predictive analysis and output, the input data may provide a corresponding output based on the trained classifications.

Layers, branches, clusters, or the like of the ML models and/or NNs may be trained by using training data associated with data records and a feature extraction of training features. By providing training data, the nodes in the hidden layer may be trained (adjusted) such that an optimal output (e.g., a classification) is produced in the output layer based on the training data. By continuously providing different sets of training data and/or penalizing the ML models and/or NNs when the outputs are incorrect, the ML models and/or NNs (and specifically, the representations of the nodes in the hidden layer) may be trained (adjusted) to improve its performance in data classifications and predictions. Adjusting of the ML models and/or NNs may include adjusting the weights associated with each node in the hidden layer.

As such, simulation engine 136 may compute, determine, and/or simulate scenarios for service provision for a UX for the user based on user data 132, agent data 133, and service states 134. Scenarios may correspond to different dynamic UI features and parameters, content in the UIs, controls or fields of the UIs, and/or communication channels for use, display, and/or rendering of the UIs. Simulation engine 136 may use such scenarios to generate simulated UXs and UIs 137 based on the corresponding scenarios that have been simulated for UXs provided to the user and/or agent when interacting with service provider server 120. As such, simulated UXs and UIs 137 may be used to provide dynamic UIs and content to customers and/or agents during service provision. In order to do so, simulation engine 136 may generate code 138 representing the computing code for rendering UIs and content to customers and agents on devices through particular communication channels. Code 138 may include dynamic JSON objects and/or JSON code for an HTTP framework to execute calls.

UIs 137 may be provided in and/or utilized through a particular communication channel, such as a conversational UI channel, a multimedia UI channel, a web-based chat channel, an instant messaging channel, a text-to-speech UI channel, an interactive voice response channel, or an email channel. As such, different UXs may include interactions through different communication channels used by UIs 137 for users and/or agents to interact with service provider server 120. As such, options to select from UIs 137 may be provided to client device 110 and/or agent endpoint 140, including selections 139 of certain UIs, content, forms and/or UI controls, and/or communication channels. Once selections 139 have been made, one or more of UIs 137 may be transmitted to the customer, agent, or the like. For example, one of UIs 137 selected for client device 110 may be provided by configuring and transmitting a webpage or application interface to client device 110 for display using application 112, which may be served via a webpage or software application presented on client device 110. Code 138 may be used to generate and transmit the UI to client device 110, or instructions, partial instructions and/or configuration data for the UI from code 138 may be transmitted to client device 110 for generating and/or rendering the UI on client device 110. In a similar manner, agent endpoint 140 may receive one or more of UIs 137 through corresponding communication channels and code 138. The components and/or operations of UX code development application 130 are discussed in further detail with regard to FIGS. 2-4 herein.

Service applications 122 may correspond to one or more processes to execute modules and associated specialized hardware of service provider server 120 to process a transaction and/or provide other computing services to users, which may include content and/UIs dynamically determined and configured for a UX. As such, service applications 122 may be used in combination with UX code development application 130 by client device 110 and/or agent endpoint 140 to provide dynamic UIs and content to users. For example, service applications 122 may be used to process payments and other services to one or more users, merchants, and/or other entities for transactions, which may require assistance prior to, during, or after transaction processing and other service provision through dynamic UIs and content for UX code development application 130. In this regard, service applications 122 may correspond to specialized hardware and/or software used by a user to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. In some embodiments, the financial information may also be used to establish a payment account and provide payments through the payment account.

The payment account may be accessed and/or used through a browser application and/or dedicated payment application. Service applications 122 may be used to process a transaction, such as using an application/website or at a physical merchant location. In some embodiments, service applications 122 may further be used to provide rewards, incentives, benefits, and/or portions of a cost or price of a transaction based on the transaction being processed for a purchasable item. Service applications 122 may process the payment and may provide a transaction history for transaction authorization, approval, or denial. However, in other embodiments, service applications 122 may instead provide different computing services, including social networking, microblogging, media sharing, messaging, business and consumer platforms, etc. These computing services may therefore be used by customers and users, such as a person using client device 110, and therefore those customers and users may receive dynamic UIs and content based on determinations and configurations generated and provided by UX code development application 130.

Service applications 122 as may provide additional features to service provider server 120. For example, service applications 122 may include security applications for implementing server-side security features, programmatic client applications for interfacing with appropriate application programming interfaces (APIs) over network 150, or other types of applications. Service applications 122 may contain software programs, executable by a processor, including one or more GUIs and the like, configured to provide an interface to the user when accessing service provider server 120, where the user or other users may interact with the GUI to view and communicate information more easily. In various embodiments, service applications 122 may include additional connection and/or communication applications, which may be utilized to communicate information to over network 150.

Additionally, service provider server 120 includes database 124. Database 124 may store various identifiers associated with client device 110. Database 124 may also store account data, including payment instruments and authentication credentials, as well as transaction processing histories and data for processed transactions. Database 124 may further store UI forms and content 126, which may be used by UX code development application 130 when generating dynamic UIs and content, including UI configurations and controls, based on a UX provided to the user. Such determinations may be based on user and/or agent information, which may further be stored by database 124. As such, UI forms and content 126 may include pre-generated template forms and content, which may be selected, configured, combined, and used for dynamically UIs and content.

In various embodiments, service provider server 120 includes at least one network interface component 128 adapted to communicate client device 110, agent endpoint 140, and/or another device/server for a merchant over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Agent endpoint 140 may be implemented using any appropriate hardware and software configured for wired and/or wireless communication with client device 110, and/or service provider server 120 for assisting a user associated with client device 110, such as a customer, in utilizing or receiving assistance with computing services provided by service provider server 120. In some embodiments, such computing services may include processing a transaction or receiving service assistance when the user utilizes client device 110 to interact with service provider server 120. As such, agent endpoint 140 may correspond to a data endpoint that connects to and exchanges data with client device 110 and/or service provider server 120. Although agent endpoint 140 and service provider server 120 are discussed as separate devices and servers, in some embodiments, one or more of the described processes of agent endpoint 140 may instead be provided by service provider server 120, such as through CRM.

In some embodiments, agent endpoint 140 may include and/or may be implemented as an application having a UI enabling the agent to interact with client device 110. For example, during a chat session between client device 110 and agent endpoint 140, the user of client device 110 may request assistance from the agent of agent endpoint 140 or otherwise engage with the agent, such as to process a transaction, review a transaction, assist with account services, rectify fraud issues or alerts, and the like. Such services may be assisted based on dynamic UIs and content generated by service provider server 120. Once generated, service provider server 120 may cause the display and/or rendering of the UIs and/or content having interface element on client device 110 and/or agent endpoint 140. For example, service provider server 120 may generate webpage and/or application UIs, which may be transmitted to client device 110 and/or agent endpoint 140 for display, or may provide executable instructions, partial instructions, application and/or UI configuration data to client device 110 and/or agent endpoint 140 for UI display and/or rendering.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
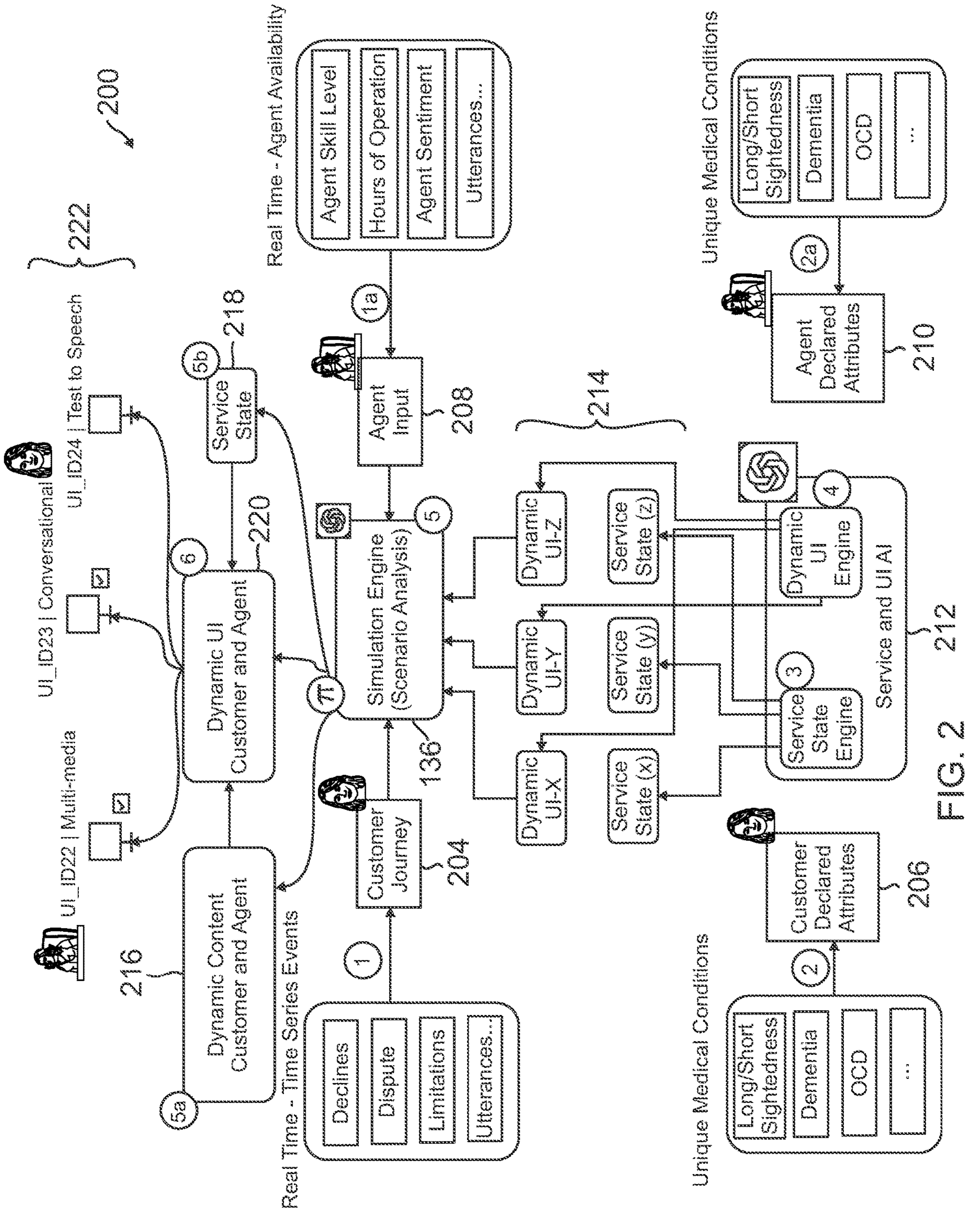
FIG. 2 is a system environment where dynamic UIs and content may be provided to users and agents during a UX of a computing service by the user, according to an embodiment.

FIG. 2 is a system environment 200 where dynamic UIs and content may be provided to users and agents during a UX of a computing service by the user, according to an embodiment. System environment 200 includes a simulation engine 136 of service provider server 120 discussed in reference to system 100 of FIG. 1. System environment 200 may correspond to an environment where different activities are performed that lead to generation of dynamic UIs, content, and the like that may be presented to and configured by users and agents during UXs of the users with a service provider and/or computing services of the service provider.

In this regard, system environment 200 includes steps performed by a service provider using the components and data shown to provide dynamic programming of UIs and content by simulation engine 136. Initially, a customer may interact with a service provider, such as through one or more computing services, communication channels, and the like, in order to receive a product or service, such as engage in electronic transaction processing. The customer may be associated with a customer journey 204 and have customer declared attributes 206. For example, customer journey 204 may correspond to real-time and/or time-series events and other corresponding data for the interactions of the customer with one or more products and/or services of the service provider, which may be ordered and associated with the customer based on the customer's identity, account, user or device identifier, or the like used or provided during the customer's interactions. With an online transaction processor, such interactions may be associated with transaction declines (including reason for decline), disputes, account or user limitations (e.g., credit or transaction maximums, location limitations for transaction processing, etc.), utterances or statements by the customer with an agent of the transaction processor, merchant, chat bot, or the like, and other information. Customer declared attributes 206 may include those characteristics or user parameters associated with medical conditions, disabilities, a residency, a language, and the like.

As noted above, customer journey 204 may include interactions by the customer with an agent, such as a customer service representative, salesperson, risk or compliance officer, and the like. The agent may be associated with an agent input 208 and agent declared attributes 210. Agent input 208 may correspond to real-time agent availability data, which may include an agent skill level and/or available agent skills, hours of operation, an agent sentiment, and/or utterances or statements made by the agent to the user (as well as in general and/or during previous sessions for a workday, last X hours, etc.). Multiple agent systems (e.g., workforce management, agent queue, CRM, contact performance, sentiment analysis, etc.) may interact to determine agent input 208. Agent declared attributes 210 may include similar characteristics or parameters to the user or customer, such as medical conditions, disabilities, a residency, a language, and the like associated with the agent.

As such, at a step 1, customer journey 204 of the customer with the service provider is provided as input to simulation engine 136, and at step 1*a*, agent input 208 of the agent may also be input to simulation engine 136. Further, at steps 2 and 2*a*, customer declared attributes 206 and agent declared attributes 210, respectively, are provided as input to simulation engine 136. Thereafter, a service and UI AI 212 may be invoked to generate different dynamic UIs having content for different service states and UXs that may be progressed by the customer. Service and UI AI 212 may include a service state engine that, at step 3, may generate JSON configurations and/or other computing code configurations and data objects, including various service states, for computing services that may be accessed and/or utilized via a UI when a user interacts with a service provider during a UX. Each service may have a unique state (e.g., good, failed, partially failed, high latency, etc.) at a particular time.

The service state engine of service and UI AI 212 may serve to maintain and relay the state of service to a dynamic UI engine. A service may correspond to a computing service and/or corresponding microservices of an application architecture, which may be utilized during a UX of a user with a service provider. In this regard, a state of a service may correspond to the current availability, latency, load, and/or other processing and performance measurements or statuses that indicate whether a service can be used, and how well that service can process requests from users or other perform tasks. For example, a service state may indicate a status, such as "available," "good status," "failed," "partially failed," "high latency," which may indicate service health and/or whether the service is available to be used and the state of the service's availability.

The dynamic UI engine may generate UIs for use of the different services through UI fields, UI controls, navigations, and/or processing features on different dynamic UIs. The dynamic UI engine of service and UI AI 212 may, at step 4 (e.g., during generation of dynamic UIs), utilize the latest service states of the computing services to determine different dynamic UIs having content that invokes such computing services. The content provided dynamically in UIs by the dynamic UI engine may therefore include different services provided based on their service states, as well as their likelihood of use and/or correlation with customer journey 204 and/or other UX of the customer with the service provider. As such, service and UI AI 212 may output UI configurations 214, which may indicate the service states of computing services and configurations for dynamic UIs that may use those computing services based on their states. UI configurations 214 may include content, controls, and the like for the UIs.

In some embodiments, service and UI AI 212 may correspond to an LLM-based and/or generative AI-based engine, which may utilize the service state engine and dynamic UI engine to provide, for UI configurations 214, dynamic JSON objects for the dynamic UIs based on user inputs and/or JSON code for an HTTP framework to execute API calls and the like to services. This may be done through dynamic programming of such JSON objects and code by simulation engine 136 when simulating different scenarios for a UX and dynamic UIs provided to the customer and/or agent. Such dynamic programming may be based on combinations of computing code available for UI parameters and computing service calls and interactions, which may correspond to permutations of the scenarios that may be available to the customer and/or agent through dynamic UIs and corresponding content.

To do so, a binomial coefficient may be used as a process to pick k unordered outcomes from n possibilities. The binomial coefficient may also be represented as nCk, where simulation engine 136 may rely on two unordered outcomes of from unordered service states (e.g., from service availability and status) and dynamic UIs (e.g., from customer and/or agent data). The unordered outcomes may be sCk, where s is a service state vector for service state possibilities, and uCk, where u is a UI vector for UI possibilities. As such, service state and dynamic UI combinations may be predicted by simulation engine 136 through a computation using these unordered outcomes, which may then be provided to the customer and/or agent for selection and configuration (e.g., via selections 139 in system 100 of FIG. 1). This may include using dynamic programming to combine, adjust, and/or generate UI and UI parameter computing code for dynamic UI and content provision by simulation engine 136. Usage of binomial coefficients for a service state vector and a UI used to calculate different combinations of input features and their vectors (e.g., permutations of UI and service states for dynamic UI and content presentation) for dynamic programming may be computed using the following Equation 1:

$$(s+u)^n = \sum_{k=0}^{n} nCks^{n-k}u^k = {}^nC_0 s^n u^0 + {}^nC_1 s^{n-1} u^1 + \ldots + {}^nC_r s^{n-r} u^r + \ldots + {}^nC_n s^0 u^n \quad \text{Equation 1}$$

A such, as step 5, simulation engine 136, using a LLM, generative AI, or other ML or NN-based engine, may assimilate the input variables from the above-described steps 1-4 and generate permutations of the scenarios to service dynamic UIs to the agent and/or user. These scenarios may be used to offer a combination output of content, communication channel, service state, and the like that provide one or more best options to have a likely impact on the customer or agent (e.g., to induce engagement, reduce churn rate and abandonment, increase customer satisfaction or sentiment, etc.).

With step 5, steps 5*a* and 5*b* may be performed to determine dynamic content 216 and service state 218 used for assembly and provision of dynamic UI 220. During step 5*a*, simulation engine 136 may generate, such as using a LLM and/or generative AI capabilities, dynamic content using the input variables. An inventory of content with corresponding unique IDs may be created and applied (e.g., by the LLM) to predict such combinations. During step 5*b*, models may compute and predict optimal or best combinations of UIs and computing services from service states. These may be predicted by simulation engine 136 as different scenarios and may be based on available UI parameters, forms, and templates, and the like in one or more UI catalogs for UI provision and presentation.

When generating these combinations and available options for dynamic UI 220, computing code for UI configurations 214 may be utilized such that simulation engine may utilize the computed combinations from steps 5*a* and 5*b* to generate, at step 6, dynamic UI 220, which may correspond to one or more dynamically created UIs for the customer and/or agent in one or more communication channels and having corresponding content for computing services. During step 6, different combinations or assemblies of the components available to generate and cause display of dynamic UI 220 on a corresponding device may be determined based on UX scenario combinations and scores, which may then be offered to the customer and/or agent for selection of different UI layouts, configurations, communication channels, and the like. For example, the combination of components may include available UI layouts, fields, controls, content, and the like, and may be provided through a particular communication channel (e.g., web chat-based, email, text message, voice/IVR, etc.). As such, the customer and/or agent may view dynamic UI options 222 for configuring and rendering in one or more communication channels for the customer's UX and service provision and/or assistance.

Figure 3A:
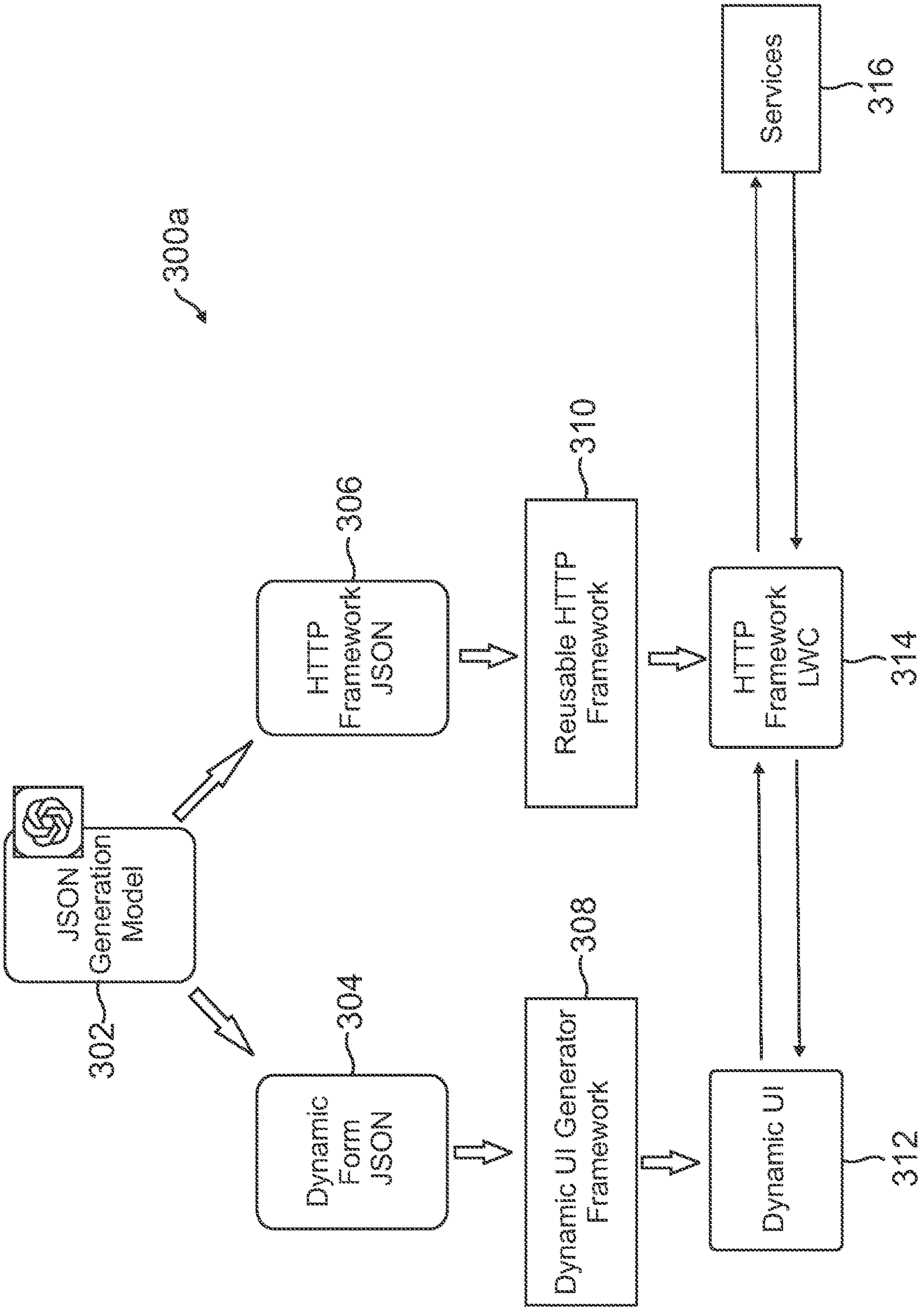
FIGS. 3A-3C are diagrams of interactions by applications and system components performed when generating dynamic UIs and content based on a UX of a user with a service, user and agent data, and a service state of the service, according to an embodiment.
Figure 3B:
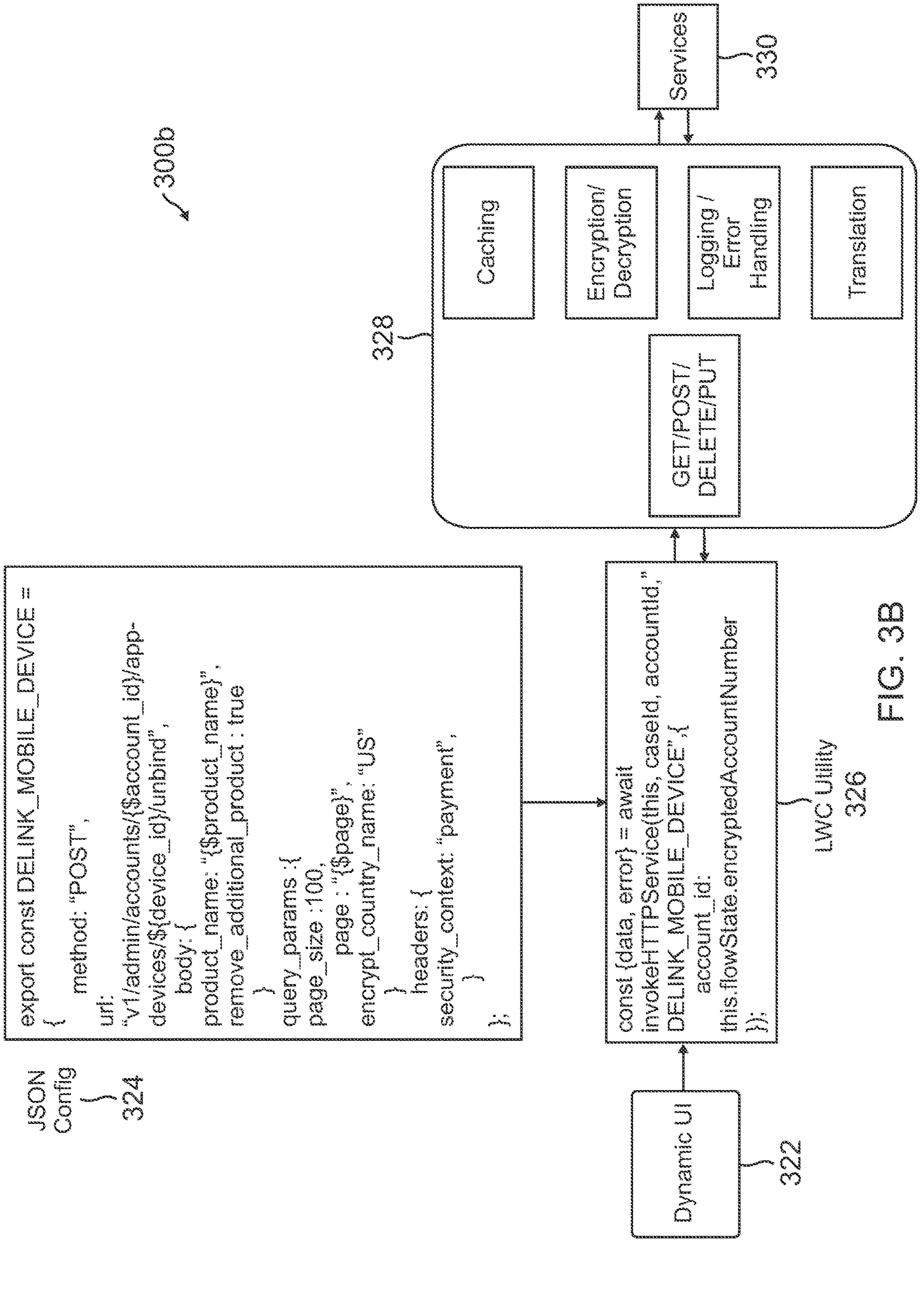
Figure 3C:
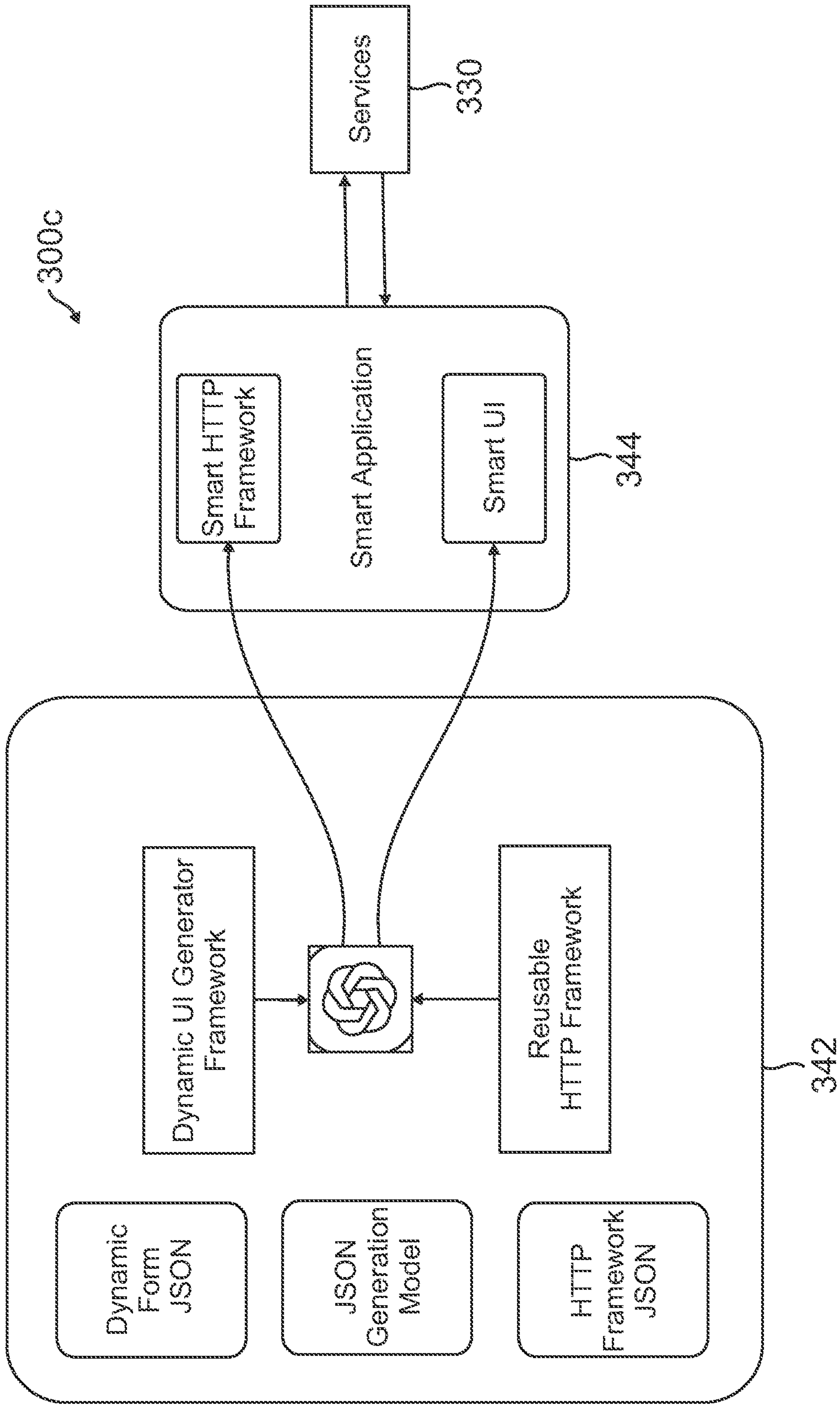

FIGS. 3A-3C are diagrams 300*a*-300*c* of interactions by applications and system components performed when generating dynamic UIs and content based on a UX of a user with a service, user and agent data, and a service state of the service, according to an embodiment. For example, diagrams 300*a*-300*c* may be performed by UX code development application 130 of service provider server 120 in system 100 of FIG. 1, such as when generating computing code for dynamic UIs and content using JSON or similar objects for dynamic forms and JSON or similar code for a reusable framework HTTP to execute calls and perform other API requests and responses. As such, operations in diagrams 300*a*-300*c* may be performed by one or more components of service provider server 120 when interacting with client device 110 and/or agent endpoint 140 in system 100.

In diagram 300*a*, interactions between components are shown to generate different dynamic UIs with content based on a UI framework and corresponding JSON objects and code for such UIs and content. In this regard, a JSON generation model 302 may correspond to an ML, NN, or other AI-based model and/or engine, including a LLM and/or generative AI, to generate JSON containers and objects for dynamic UIs from JSON UI forms, fields and/or other parameters, as well as JSON code for HTTP calls and the like. For example, JSON generation model 302 may take, as input, one or more scenarios determined for a UX of a user and may generate dynamic form JSON 304 and HTTP framework JSON 306 used to create dynamic UIs and content to provide services to the user and/or an agent assisting the user. Although JSON containers and/or other objects and code are described with regard to diagrams 300*a*-300*c*, other file and/or data exchange formats for UIs and API calls may also be used.

Dynamic form JSON 304 may correspond to containers and/or objects used for UI generation, which may be dynamically created, such as using JSON code for UI parameters, fields, forms, templates, and the like of usable UIs in different communication channels. HTTP framework JSON 306 may correspond to JSON code for API calls and the like that are executable to services to call those services from and/or using one or more dynamically created UIs and provide such services to the user through the UI(s). Dynamic UI generator framework 308 may then process dynamic form JSON 304 with the scenarios and other determined flows for the UX with the user. This may correspond to generating computing code for different iterations, layouts, configurations, communication channel designations, and the like of different dynamic UIs. Reusable HTTP framework 310 may similarly process HTTP framework JSON 306 for customizing the framework, such as using Frontend Web Components (FWC) for customized UIs. Reusable HTTP framework 310 may therefore provide UI generation and service mapping for backend code. Such code may correspond to generated JSON code that makes and/or executes service calls. The JSON for Reusable HTTP framework 310 may be generated using an AI model, such as a generative AI, where the JSON code for UI generation is similarly generated by an AI model.

As such, dynamic UI generator framework 308 may create a dynamic UI 312. However, with content for dynamic UI 312 provided from one or more services, such as based on service state and the like, reusable HTTP framework 310 may generate a HTTP framework FWC for the service calls and other requests or responses to interact with services 316. As such, dynamic UI 312 may utilize HTTP framework FWC 314 that includes computing code generated to interact with services 316 for dynamic content provision.

In FIG. 3B, diagram 300*b* shows an exemplary dynamic UI 322 that includes computing code for a JSON configuration 324 and an FWC utility 326 that may interact, such as to perform different calls, execute events, or the like based on dynamic content, UI controls, and the like for dynamic UI 322. For example, dynamic UI 322 may be associated with JSON configuration 324 as a data container or object for the UI fields, forms, menus, controls, and the like for UI, which may be used when dynamic UI 322 is output to provide of dynamic content and other UI data in the UI (e.g., when the UI is rendered or displayed by a computing device, such as based on received UI data, code, configurations, or the like). JSON configuration 324 may be generated based on different UI display parameters for dynamic UI 322, which may be contained in a serialized container for array or object data. As such, in diagram 300*b*, JSON configuration 324 may correspond to a container that includes UI data in the form of data code that may be used for UI presentation and execution of calls for UI data. FWC utility 326 may therefore interact with JSON configuration 324 as a dynamic HTTP framework to execute such calls to APIs via the commands from dynamic UI 322.

A set of UI operations 328 may be associated with such calls and may be used to interact with services 330. For example, UI operations 328 may include different operations for get, post delete, or put in HTTP, such as CRUD (create, read update, delete) operations that may allow for use and manipulation of target resources including services 330 from dynamic UI 322. UI operations 328 may also include those associated with caching data, security or encryption/decryption, logging and error handling, format translation during calls between different services or platforms, and the like. As such, UI operations 328 allow dynamic UI 322 to interact with services 330 via the computing code dynamically generated for JSON configuration 324 and FWC utility 326.

In FIG. 3C, diagram 300*c* shows a dynamic UI generator 342 that may utilize a smart application 344 to provide services 330 to users and/or agents in an automated and dynamic manner with low or little coding and code development. For example, dynamic UI generator 342 may include the aforementioned components for a JSON generation model that provides dynamic form JSON and HTTP framework JSON usable by a dynamic UI generator framework and reusable HTTP framework to generate dynamic UIs. However, smart application 344 may be integrated to provide smart and dynamically customized UIs based on a smart HTTP framework that is adjustable and/or configurable (e.g., using JSON containers, code, and the like) with a smart UI to provide services 330 through the generated dynamic UIs. This may reduce the overall code development by allowing the dynamic UIs to be provided from smart application 344.

In diagram 300*c*, the reusable HTTP framework may include a JSON configuration that is generated by a generative AI or other AI model and/or system, such as by generating the JSON code for the configuration. The reusable HTTP framework may use the JSON configuration and code to then generate the backend code used for UI generation and configuration. Similarly, a dynamic UI JSON configuration may be generated by a generative AI for use by smart application 344. As such, a dynamic UI generator framework uses the generated JSON code to generate the dynamic UI that may be presented via smart application 344.

Figure 4:
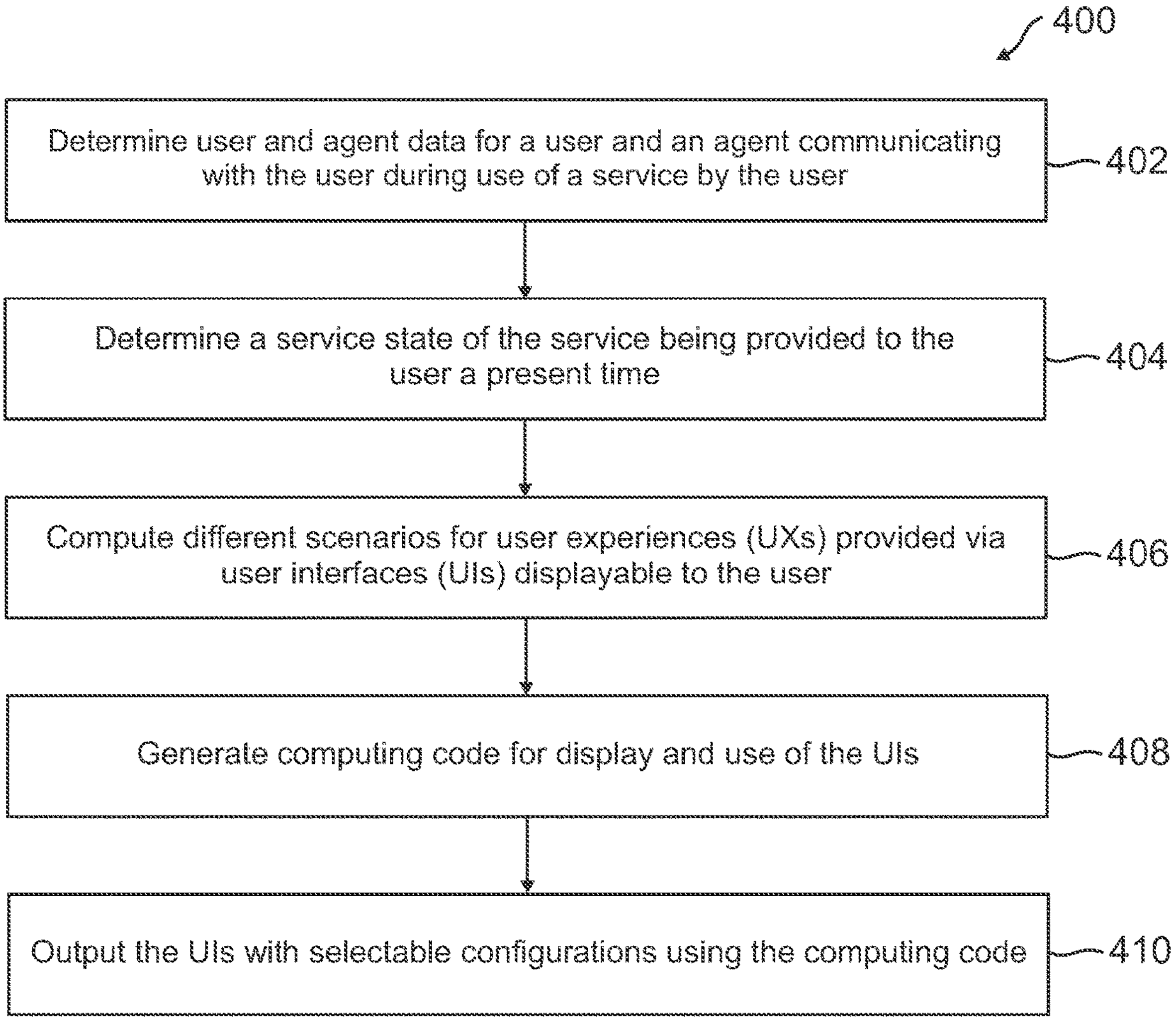
FIG. 4 is a flowchart for dynamic user interfaces and content with reduced code development using an intelligent scenario simulation engine, according to an embodiment.

FIG. 4 is a flowchart 400 for dynamic user interfaces and content with reduced code development using an intelligent scenario simulation engine, according to an embodiment. Note that one or more steps, processes, and methods described herein of flowchart 400 may be omitted, performed in a different sequence, or combined as desired or appropriate.

At step 402 of flowchart 400, user and agent data for a user and an agent communicating with the user during use of a service by the user is determined. The user may correspond to a customer of a merchant and/or service provider, who may be utilizing a computing service, engaging in a purchase or transaction processing, or otherwise performing computing activities that may require assistance or engagement by an agent of such merchant and/or service provider. In this regard, the user's data may be associated with real-time time-series events (e.g., transaction declines, transaction disputes, account limitations, or user utterances) for the use of the service by the user, as well as user characteristics (e.g., unique conditions, preferences, and/or characteristics including media conditions, disabilities, residency, or language). Similarly, an agent may be associated with real-time data, such as their agent availability (e.g., an agent skill level, hours of operation, an agent sentiment, or agent utterances), as well as their characteristics (e.g., medical conditions, disabilities, a residency, or a language).

For example, a customer using client device 110 in system 100 of FIG. 1 may utilize such device with service applications 122, such as a transaction processing application to process a transaction with a merchant or other seller. An agent interacting with the customer and client device 110 through agent endpoint 140 may provide services and assistance to the customer, which may trigger service provider server 120 to, through UX code development application 130, generate computing code for UIs displayable to the customer based on different scenarios for the UX and processing flow being engaged with by the customer. To do so, user and/or agent data may be determined in order to customize and configure the UIs through automated and low code development processes of a simulation engine, which may execute one or more ML models, such as NNs, LLMs, generative AI, and the like.

At step 404, a service state of the service being provided to the user at a present time is determined. The service state of the service may be associated with availability and/or states of computing services that may be used during a customer's journey (e.g., UX) of the user with the service, service provider, and/or agent. For example, a UX may include a history and/or past events for an engagement of, use by, or interactions by the user with one or more services, service provider, and/or agent. In system 100, the customer may utilize client device 110 initially to use a computing service, such as through service applications 122. This may begin a customer's journey, and, in some embodiments, the customer's journey may further include previous activities and events by the customer with the same or other computing services of service provider server 120.

During use of the computing service, the customer may engage with an agent via agent endpoint 140 to request assistance, navigate through the computing service, complete service use, or the like. As such, at a certain time during the use of the computing service, the customer may have a specific UX of the service being provided to and/or utilized by the customer, which may be identified through current and/or past computing activities, processing events, input, data, or the like. The service states of computing services may therefore assist in identifying and determining the latest state of each service that may be used through a dynamic UI to assist the user with service usage and/or provision during the UX and customer's journey.

At step 406, different scenarios for UXs provided via UIs displayed to the user are computed, where the UIs include different content, controls, and the like. In this regard, the service provider utilized by the user, such as service provider server 120 in communication with client device 110 of a customer or the like, may include an intelligent processor that simulates scenarios for users to interact with a service provider during UXs provided to users by the service provider (e.g., through the available computing services, agents and/or employees, digital platforms, websites and/or applications, and the like). This may correspond to simulation engine 136 that may dynamically configure UIs and content provided to those users through low code development using pre-configured and/or pre-generated template UIs, content, UI controls, and the like with corresponding computing code. For example, using a computing framework, a set of UI parameters, forms, and/or templates may be initially coded and provided that allow for dynamic configuring and/or combining in order to provide specifically tailored UIs, content, UI controls, UI fields, and the like to users depending on the UX including service state, user and/or agent data, and/or communication channel (e.g., a conversational UI channel, a multimedia UI channel, a web-based chat channel, an instant messaging channel, a text-to-speech UI channel, an interactive voice response channel, or an email channel).

As such, simulation engine 136 may correspond to an ML model-based system and/or engine, such as one executing one or more ML models, NNs, LLMs, generative AIs, and/or the like, which may be trained to predict permutations of different scenarios of a UX depending on combinations of input variables and/or features from the user and/or agent data, service state, and the like. The permutations may correspond to different scenarios, where the combinations may correspond to different user and/or agent characteristics, real-time data for the user and/or agent, current service state and such input, navigations, or processing events by the user with the service, and the like. A highest scored permutation may be selected for a UI or multiple different UIs may be determined for different scenarios and the like, where each selected may meet a threshold compatibility or likelihood of use score when determined by simulation engine 136.

At step 408, computing code for display and use of the UIs is generated. Simulation engine 136 may generate computing code using the template and/or form computing code for such pre-generated UIs, content, UI controls, UI fields, available communication channels, and the like. Multiple different UIs based on different scenarios may be generated through computing code for those UIs and UI parameters, which may be based on scoring and/or predicting likelihood of use of those UIs. For example, service provider server 120 may use simulation engine 136 to create a first dynamic UI in a web-based channel having first content and UI controls or fields for configuring the first dynamic UI by the user and/or agent. However, a different layout, content, controls or fields, or the like may be determined and generated for a second dynamic UI in a different channel (e.g., an email-based channel) based on a different permutation and scenario for the UX that has been determined by simulation engine 136.

In some embodiments, ML models and NNs may be used to configure and/or create the computing code with low code development using the template or form code, which may include UIs and their corresponding communication channels, controls or fields to configure the UI (e.g., available processes, inputs, media display or playback, navigations, etc.). For example, ML models and/or NNs may be used to predict coding and code configurations for different scenarios of the UX being provided to the user through the dynamic UIs. However, other ML-based techniques may also be used for computing code generation from such code forms and templates for UIs and their corresponding content.

At step 410, the UIs are output with selectable configurations using the computing code. For example, service provider server 120 may provide, to client device 110 and/or agent endpoint 140, the dynamic UIs that have been generating by causing the dynamic UIs to be output or displayed via the corresponding communication channel(s). In some embodiments, prior to providing a dynamic UI to a user or agent, the user or agent may view options for selecting and configuring the UIs from configurations available for the UIs, content in the UIs, controls or fields for the UIs, and the like. For example, the options may allow a user to select a preferred communication channel, UI layout, UI output options (e.g., color, theme, menu types, font size or type, subtitled videos for hearing impaired, visual changes for visual impairments, etc.), and other UI display or output parameters. The service states of services may also be used to determine the content in UIs, such as the services available for use and/or data retrievable and presentable in such UIs.

The user and/or agent may therefore receive a UI or select a UI to be received, which may then be provided by the service provider using the computing code (as well as any input for a configuration and display of the UI, as applicable). Thereafter, service provider server 120 may cause the UI to be displayed on one or more computing devices based on the computing code, selection, and configuration, such as by transmitting or loading a webpage or application UI or, alternatively, transmitting code, UI configuration data, and the like to the computing device(s) to cause a web browser or other software application to render and/or display the UI. This may then allow the user (e.g., the customer on client device 110) to continue their UX with a customized and dynamic UI, including by furthering their customer's journey through additional inputs, navigations, and the like. When presented to the agent (e.g., on agent endpoint 140), such UI may be used to assist the user with their customer's journey in a more convenient and customized manner.

Figure 5:
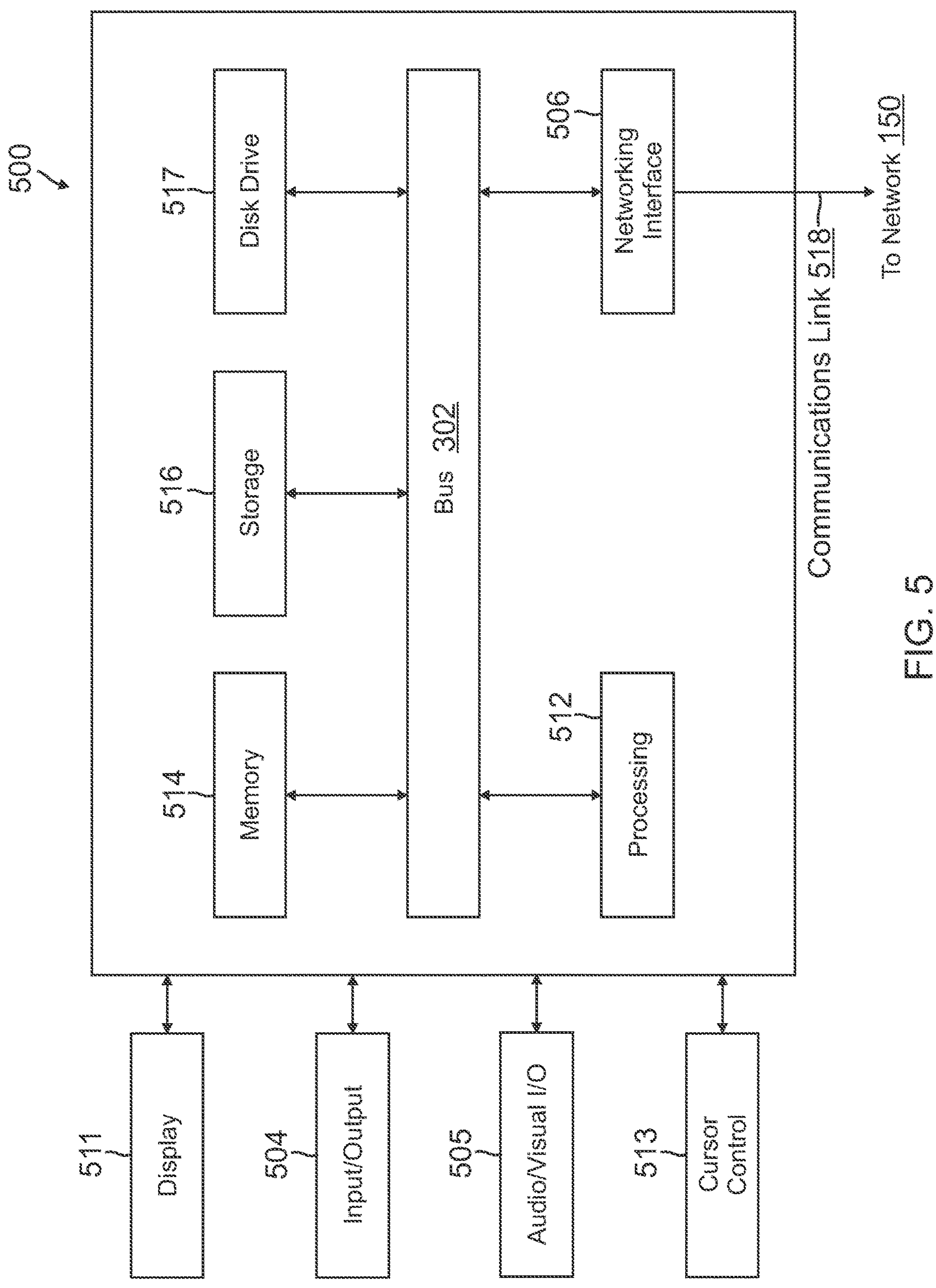
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on gift cards, other types of funding sources that can be used to fund a transaction and provide additional value for their purchase are also within the scope of various embodiments of the invention. Thus, the present disclosure is limited only by the claims.

What is claimed is:

1. A service provider system comprising:
a non-transitory memory; and
one or more hardware processors coupled to the non-transitory memory and configured to read instructions from the non-transitory memory to cause the service provider system to perform operations comprising:
determining user data associated with user features for a user, wherein the user is engaged in a use of a service of the service provider system;
determining agent data associated with agent features for an agent assisting the user with a user experience (UX) for the service;
determining a service state of at least one of the service being provided to the user or another service available to the user during the user of the service;
computing, using a simulation engine based on the user data, the agent data, and the service state, a plurality of scenarios for dynamic user interfaces (UIs) displayable to at least one of the user or the agent;
predicting, using the simulation engine, permutations of the plurality of scenarios from combinations of a service state vector representing service state possibilities and a UI vector representing UI possibilities, wherein the permutations are predicted based on computations by the simulation engine of the service state vector and the UI vector;

generating, using the simulation engine, computing code for a first dynamic UI based on the plurality of scenarios and the permutations, wherein the computing code is further generated using UI presentation parameters for presenting the plurality of dynamic UIs, wherein the UI presentation parameters comprise different communication channels, available UI content, and UI fields for the available UI content, and wherein the first dynamic UI provides the available UI content for the UX with the service; and outputting the first dynamic UI to at least one of a first computing device of the user or a second computing device of the agent using the computing code during the use of the service.

2. The service provider system of claim 1, wherein the generating the first dynamic UI comprises generating additional computing code for a plurality of dynamic UIs including the first dynamic UI based on the plurality of scenarios and the UI presentation parameters, each of the plurality of dynamic UIs for a different UX with the service, and wherein the outputting the first dynamic UI comprises outputting the plurality of dynamic UIs further using the additional computing code.

3. The service provider system of claim 2, wherein the additional computing code for each of the dynamic UIs is generated with corresponding UI content displayable in the plurality of dynamic UIs, and wherein the corresponding UI content includes UI fields with UI presentable data for the UI fields having one or more arrangements of the UI fields in corresponding ones of the plurality of dynamic UIs.

4. The service provider system of claim 2, wherein the operations further comprise:

receiving a selection of the first dynamic UI from the plurality of dynamic UIs;

rendering the first dynamic UI on the computing device of the user; and allowing at least one of the user or the agent to further configure the first dynamic UI with additional options for the UI content for the UX.

5. The service provider system of claim 2, each of the plurality of dynamic UIs is presentable using at least one of the different communication channels, and wherein the different communication channels include at least one of a conversational UI channel, a multimedia UI channel, a web-based chat channel, an instant messaging channel, a text-to-speech UI channel, an interactive voice response channel, or an email channel.

6. The service provider system of claim 2, wherein the first dynamic UI is output to one of the first computing device or the second computing device based on a corresponding one of the user or the agent receiving the first dynamic UI, and wherein the operations further comprise:

outputting a second dynamic UI of the plurality of dynamic UIs instead of the first dynamic UI to another one of the first computing device or the second computing device based on a corresponding one of the user or the agent receiving the second dynamic UI.

7. The service provider system of claim 1, wherein prior to the determining the service state, the operations further comprise:

determining customer journey information for a customer journey of the user with at least one of the service or the agent over a time period, wherein the customer journey information comprises at least one of a current conversational state between the user and the agent or past events of the user with the service, and wherein the determining the service state is based on the customer journey information.

8. The service provider system of claim 1, wherein the user features comprise real-time time series events including at least one of transaction declines, transaction disputes, account limitations, or user utterances, and wherein the user features further comprise unique user characteristics including at least one of medical conditions, disabilities, a residency, or a language.

9. The service provider system of claim 1, wherein the agent features comprise real-time agent availability information including an agent skill level, hours of operation, an agent sentiment, or agent utterances, and wherein the agent feature further comprise unique agent characteristics including medical conditions, disabilities, a residency, or a language.

10. The service provider system of claim 1, wherein the simulation engine comprises a large language model (LLM) trained to predict the permutations of the plurality of scenarios from previous combinations of previous service state vectors and previous UI vectors, and wherein at least one of the previous service state vectors or the previous UI vectors corresponding to input variables associated with the user data, the agent data, and the service state.

11. The service provider system of claim 1, wherein the generating the computing code comprises:

generating, using an LLM of the simulation engine, first computing code for dynamic content in the first dynamic UI based on a highest scored one of the plurality of scenarios, wherein the highest scored one of the plurality of scenarios comprises one of the permutations; and generating, using the LLM, second computing code for dynamic UI controls of the first dynamic UI based on the highest scored one of the plurality of scenarios, and wherein the computing code for the first dynamic UI includes the first computing code and the second computing code.

12. A method comprising:

identifying that a user is engaged in a use of a service of a service provider system with an agent assisting the user with the service, wherein the service has a corresponding service state during a user experience (UX) of the service by the user;

determining user and agent data for the user and the agent, wherein the user and agent data is associated with real-time user and agent features and historical user and agent characteristics;

computing, using a simulation engine based on the user and agent data and the service state, a UX scenario for a dynamic user interface (UI) displayable to at least one of the user or the agent;

predicting, using the simulation engine, permutations of scenarios from combinations of a service state vector representing service state possibilities and a UI vector representing UI possibilities, wherein the permutations are predicted based on computations by the simulation engine of the service state vector and the UI vector;

generating, using the simulation engine, computing code for the dynamic UI and dynamic content displayable via the dynamic UI based on the UX scenario and the permutations; and causing the dynamic UI to be displayed on at least one of a first computing device of the user or a second computing device of the agent using the computing code during the UX of the service by the user.

13. The method of claim 12, wherein the computing code comprises at least one of data containers or data objects enabling rendering of the dynamic UI with at least one UI control usable to configure the dynamic UI when displayed by the at least one of the first computing device or the second computing device.

14. The method of claim 13, further comprising:

receiving a configuration of the dynamic UI based on input for the at least one UI control; and configuring a display of the dynamic UI from the configuration.

15. The method of claim 12, further comprising:

causing at least one other dynamic UI to be displayed with the dynamic UI for at least one of different content in the at least one other dynamic UI or at least one different communication channel usable with the at least one other dynamic UI.

16. The method of claim 12, further comprising:

receiving a navigation to the dynamic UI; and continuing the UX of the service on the dynamic UI based on the navigation.

17. The method of claim 12, wherein the computing code for the dynamic UI is further generated based on a selected communication channel of a plurality of communication channels for display of the dynamic UI one the at least one of the first computing device or the second computing device.

18. The method of claim 12, wherein the user and agent data comprises at least one of real-time time series events for the use of the service, real-time agent availability information of the agent, or user and agent characteristics for the user and the agent.

19. A non-transitory machine-readable medium having stored thereon machine-readable instructions executable to cause a machine to perform operations comprising:

receiving an indication that a customer being assisted by an agent during a user experience (UX) of a computing service by the customer;

determining, based on the receiving the indication, customer data for the customer and agent data for the agent, wherein the customer data and the agent data are associated with real-time information and historical characteristics of the customer and the agent;

identifying a plurality of service states of the computing service and a plurality of corresponding services available to the customer during the UX;

determining a plurality of scenarios for assisting the customer with the UX of the computing service based on the customer data, the agent data, and the plurality of service states;

predicting permutations of the plurality of scenarios from combinations of a service state vector representing service state possibilities and a user interface (UI) vector representing UI possibilities, wherein the permutations are predicted based on computations of the service state vector and the UI vector;

determining computing code for a plurality of dynamic each having dynamic content based on the plurality of scenarios and the permutations; and providing options to select from and configure the plurality of dynamic UIs to at least one of the customer or the agent during the UX using the computing code.

20. The non-transitory machine-readable medium of claim 19, wherein the determining the plurality scenarios and the determining the computing code are performed by a simulation engine comprising at least one machine learning (ML) model, and wherein the operations further comprise:

receiving a selection of one of the plurality of dynamic UIs with a configuration of the one of the plurality of dynamic UIs and corresponding content in the one of the plurality of dynamic UIs; and rendering the one of the plurality of dynamic UIs on at least one device of at least one of the customer or the agent based on the selection and the configuration.

* * * * *